Dec. 25, 1923.
R. B. SMART
1,478,586
ADDRESSING MACHINE
Filed May 21, 1921    6 Sheets-Sheet 5
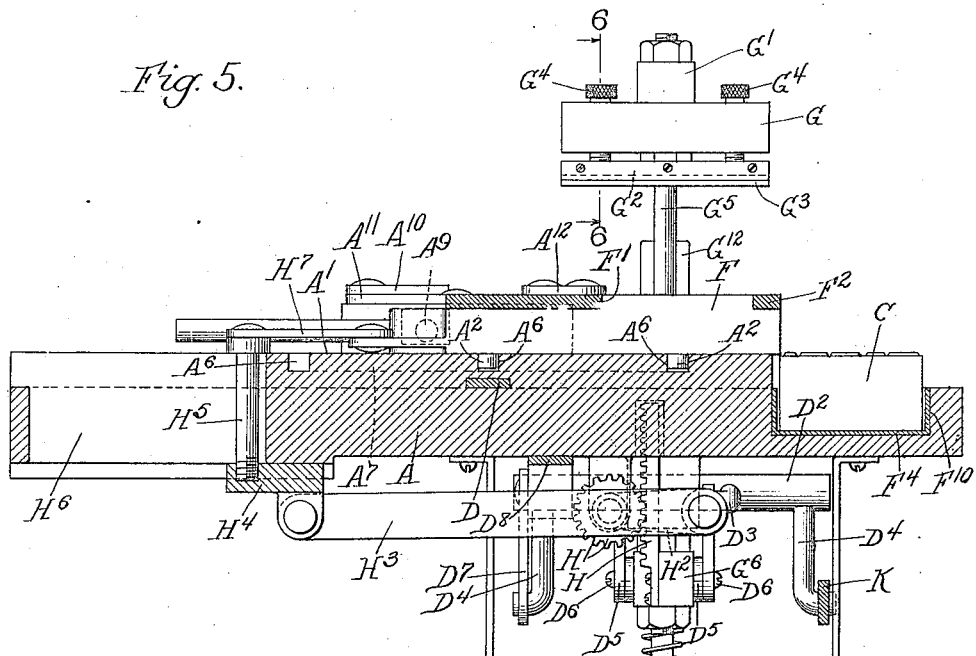
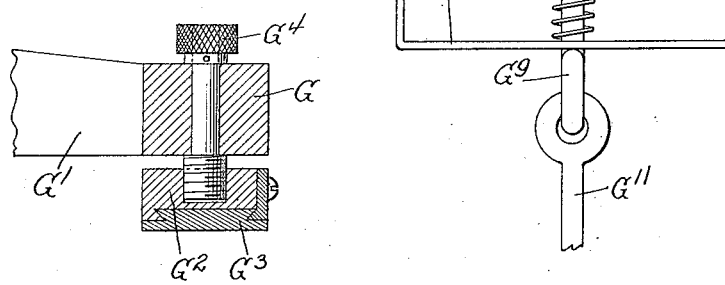
Witness
Edward T. Wray
Inventor
Rupert B. Smart
By Parker & Carter
Attorneys Dec. 25, 1923.
R. B. SMART
ADDRESSING MACHINE
Filed May 21, 1921
1,478,586
6 Sheets-Sheet 6
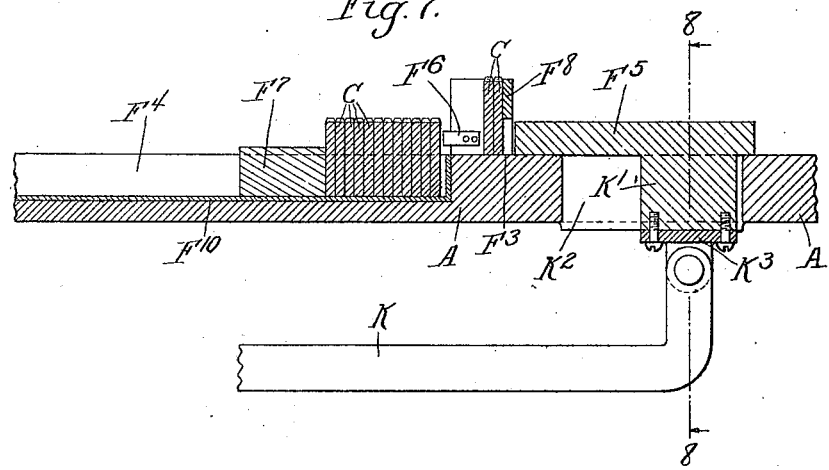
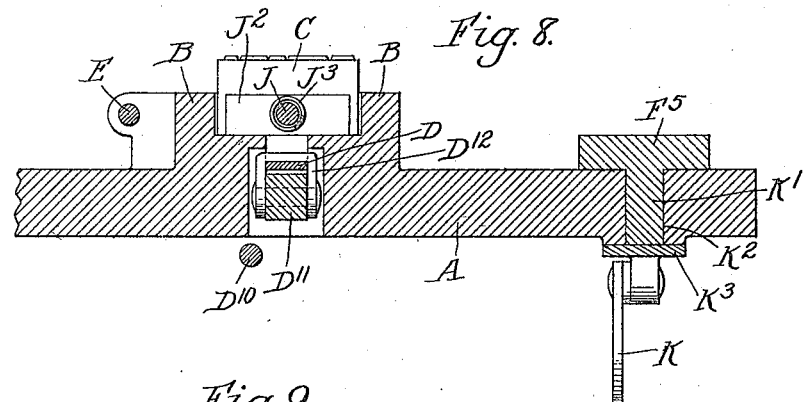
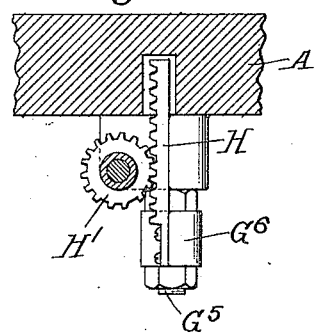
Witness
Edward T. Wray.
Inventor
Rupert B. Smart
by Parker & Carter.
Attorneys Patented Dec. 25, 1923.

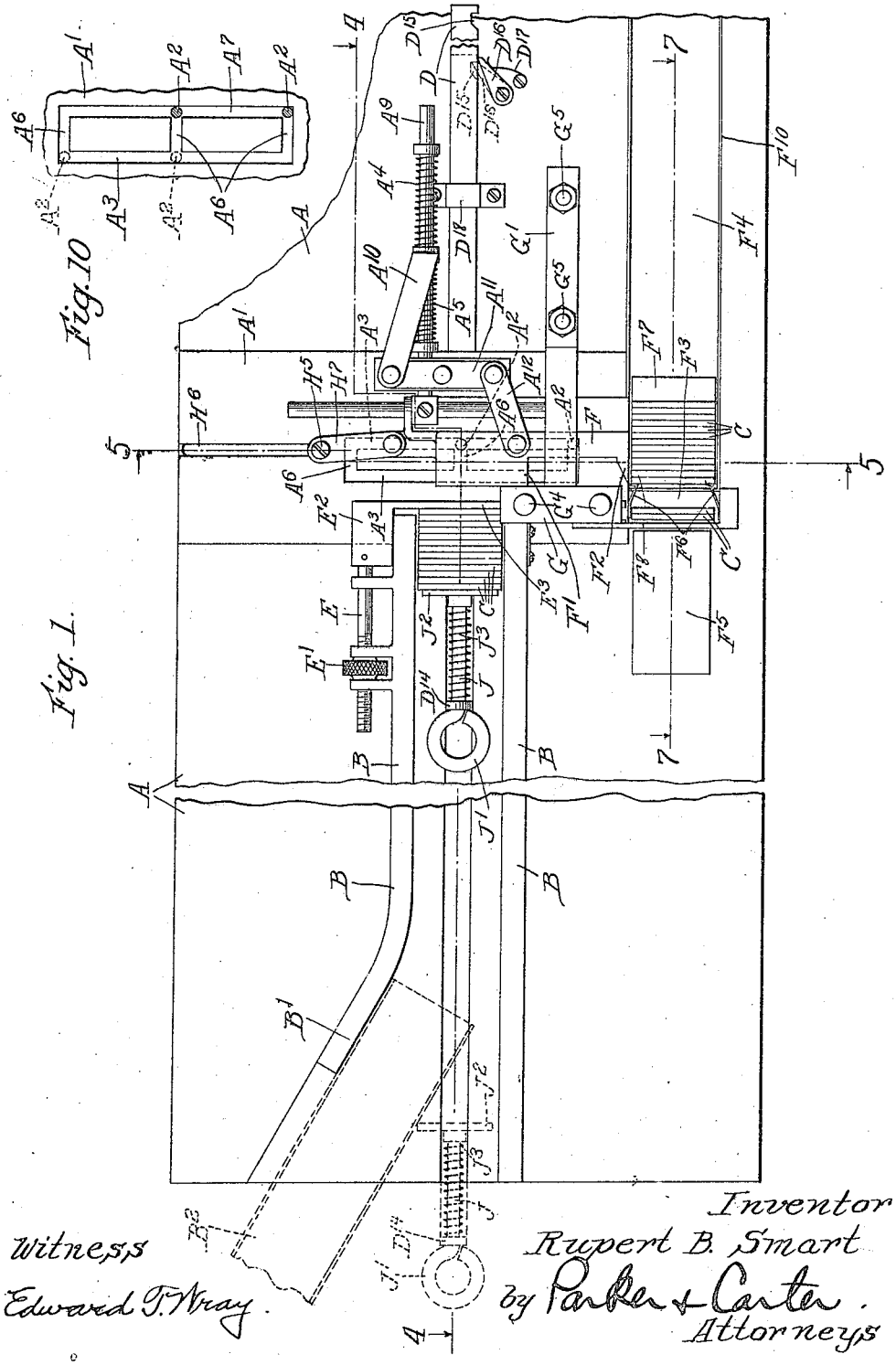

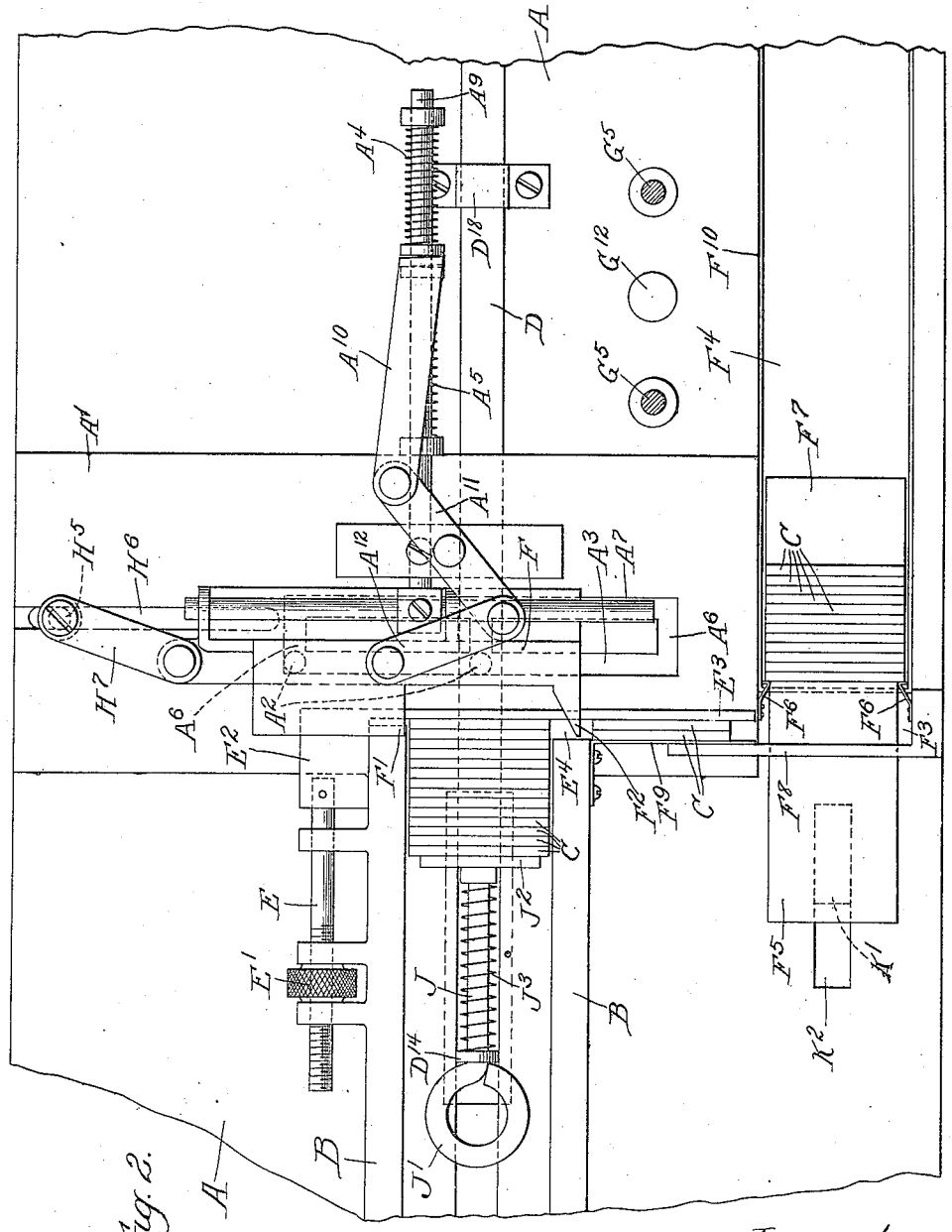

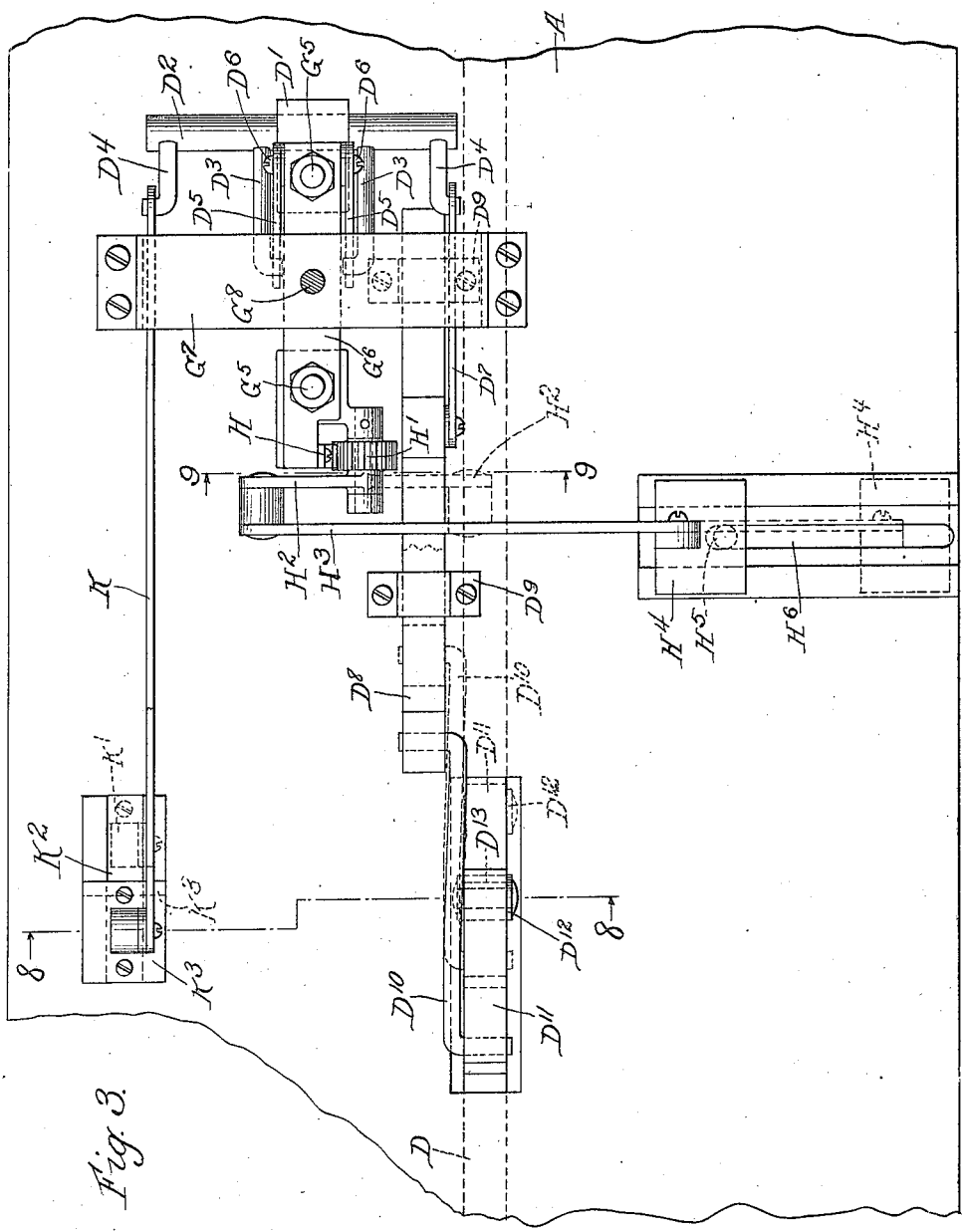

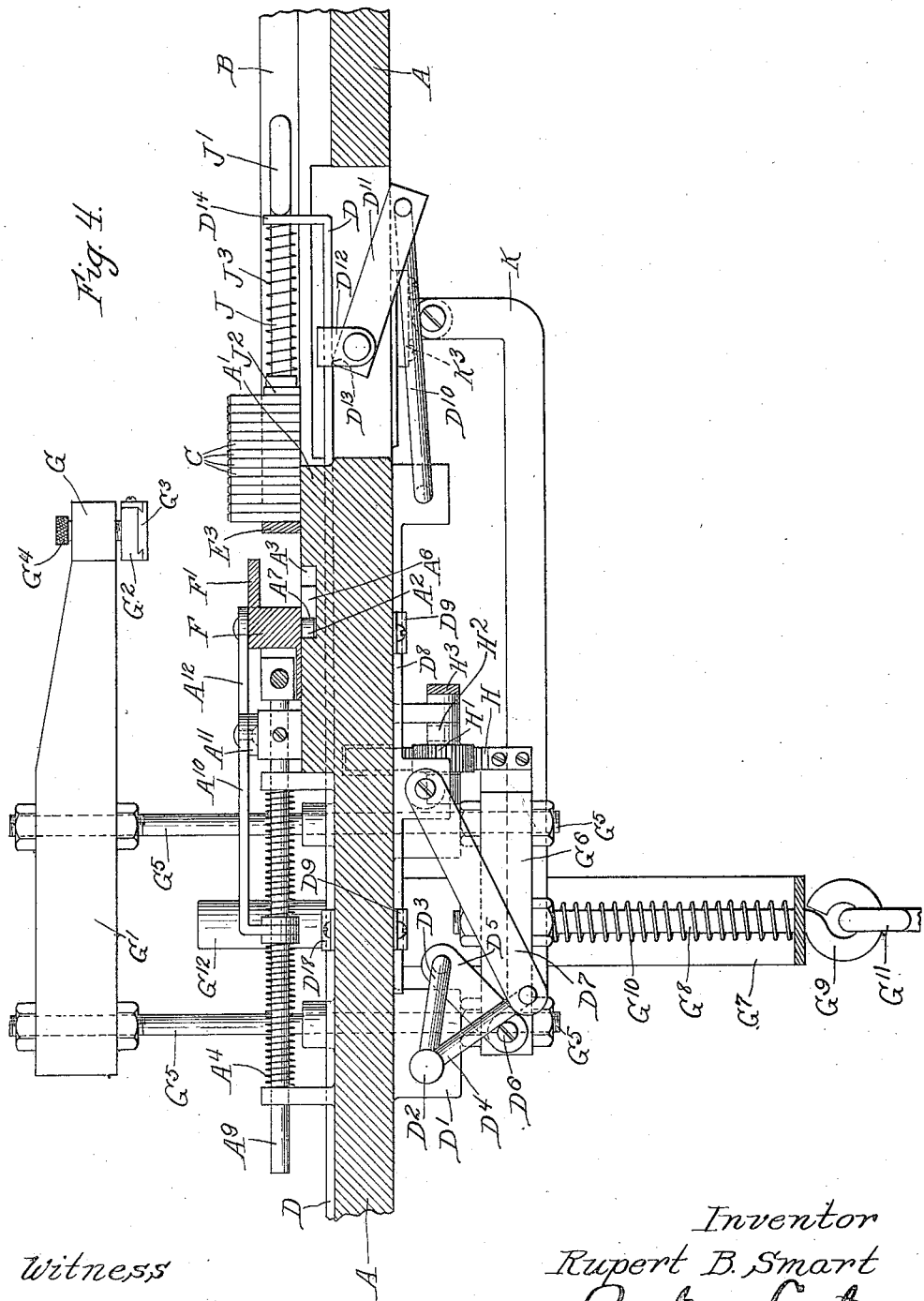

1,478,586

UNITED STATES PATENT OFFICE.

RUPERT B. SMART, OF CHICAGO, ILLINOIS.

ADDRESSING MACHINE.

Application filed May 21, 1921. Serial No. 471,495.

*To all whom it may concern:*

Be it known that I, RUPERT B. SMART, a citizen of the United States, residing at Chicago, in the county of Cook and State of Illinois, have invented a certain new and useful Improvement in Addressing Machines, of which the following is a specification.

This invention relates to an automatic addressing machine and is directed particularly to that type of machine wherein the addresses are set up in type, preferably upon a linotype machine, and are subsequently used to print the addresses. One object of the invention is to provide such an addressing machine which will automatically space the addressing elements. Thus this machine may be used for an address requiring one or more lines, and is adjustable so that it will automatically operate to print such addresses. Other objects will appear from time to time throughout the specification and claims.

The invention is illustrated more or less diagrammatically in the accompanying drawings, wherein—

Fig. 1 is a plan view with parts broken away of the invention;

Fig. 2 is a similar view on an enlarged scale with parts omitted;

Fig. 3 is a view of the under side of the machine;

Fig. 4 is a longitudinal section of the machine on lines 4—4 of Fig. 1;

Fig. 5 is a vertical section of the machine on line 5—5 of Fig. 1;

Fig. 6 is a detail vertical section on line 6—6 of Fig. 5;

Fig. 7 is a detail vertical section taken on line 7—7 of Fig. 1;

Fig. 8 is a vertical section on line 8—8 of Figs. 3 and 7;

Fig. 9 is a detailed vertical section on line 9—9 of Fig. 3.

Figure 10 is a plan view of the guide channel in the plate A'.

A is a base or frame upon which the parts of the addressing machine are grouped. B B are guide members within which the type members C are positioned and adapted to travel. One of the guide members is laterally bent as at B' so as to produce the bell mouth into which the galley B² may be inserted so that the type may be pushed from this open end between the guide members.

J is the feed carrier rod terminating at one end in the ring J'. It has mounted upon it the head J² which is yieldingly held away from the part D¹⁴ by means of the helical spring J³. The type members are progressively pushed forward by means of the step by step forward movement of the carrier rod which will be described in detail later. This movement is carried out in response to the vertical reciprocation of the printing head. Mounted at one side of the bent member B is the screw threaded rod E upon which is mounted the thumb screw E'. This rod carries at its end the block E² to which is secured the throat controller member E³. By means of the rotation of the thumb screw E' the block E² may be moved backward and forward, and thus the member E³ is moved to or away from the opening between the guide members within which the type members are located. This throat controller member E³ may be moved away from the guide members sufficiently so as to allow two lines of type to pass over the throat E⁴ and to be moved to the printing position as shown in Fig. 2. This throat controlling member may be moved so as to permit only one type member to be pushed out, or so as to permit a plurality of type members to be pushed out.

As the type is progressively fed forward in response to the forward movement of the rod J a predetermined number of type bars is moved laterally through the throat E⁴ in response to the lateral movement of the member F. This member F is moved backward and forward across the opening between the guide members B in response to the vertical reciprocation of the printing head, and with each such excursion the point F' contacts a predetermined number of type lines and moves them laterally through the throat E⁴ to the position shown in Fig. 2, in which position the printing is done.

F⁹ is a spring finger adapted yieldingly to close the throat, and hold the type in position when they have been fed forward by the member F into the printing position.

During the same lateral excursion the point F² contacts the type lines which have been previously moved to the printing position, and moves them laterally further onto the platform F³ where they remain until with the next vertical reciprocation of the printing head they are pushed off into the galley F⁴ by the lateral reciprocation of the feed block $F^5$. Spring members $F^6$ $F^6$ are provided at the gate to the galley, of insufficient strength to prevent the movement of the type before the type block $F^5$, but adapted to spring back into place on the withdrawal of the feed block, preventing return of the type. $F^7$ is any suitable means for yieldingly limiting the advance of the type in the galley, and maintaining the type in a compact body. $F^8$ is a finger or guide extending across the path of the feed block $F^5$ and adapted to prevent the type, which are pushed into position before the feed block by the finger $F^2$, from falling forward. The finger is mounted at such a height above the base on which the type stand that the feed block can penetrate beneath it and push the type forward into the galley.

The movement of the feed member F is as follows:

In response to the vertical reciprocation of the printing head through a mechanism which will presently be described, it moves laterally across the face of the plate or bed $A'$. It is guided by means of the pins or projections $A^2$ on its under side, which in its lateral excursion lies within the track depression $A^3$. It is held in this forward position by the action of the helical spring $A^4$ mounted about the rod $A^9$ through the pivoted links $A^{10}$, $A^{11}$, $A^{12}$. Immediately upon the completion of this lateral movement the helical spring $A^5$ draws the member F to the rear guided by the small grooves $A^6$, $A^6$. When the member F has moved to the rear guided by the small grooves $A^6$, it is moved laterally back through the rear groove $A^7$ by means later to be described. In this rear position the points $F'$ and $F^2$ do not strike the type. Thus the movement of the feed member F is completed through the cycle and under the influence of the spring $A^4$ it is returned to the forward position and then again moves laterally, engaging and carrying the type lines. Immediately upon the completion of this movement, it is moved backward by the spring $A^5$ and out of contact with the type lines, and with the return again to the operative position, the type as it is pushed off from the platform $F^3$ falls into the galley $F^4$ and is progressively fed forward in response to the addition of further type into the galley. When a complete set of addresses has been run through the machine, they are all in the galley $F^4$ which is positioned within the slot $F^{10}$ in the face of the base or frame A, and they may be removed and set away for further use.

The printing head G is carried at the forward end of the printing bar $G'$. The actual platen is made up of the block $G^2$ which has removably mounted on its face the rubber platen $G^3$. The whole platen is vertically adjustable by means of thumb screws $G^4$. This vertical adjustment is necessary because of the varying thickness of stock upon which printing is done. The bar $G'$ is carried upon the vertical rods $G^5$ $G^5$ which beneath the table are secured to the head $G^6$. Secured to the table on its under side is the yoke $G^7$. Centrally of the head $G^6$ is the rod $G^8$ terminating at its lower end in the eye $G^9$. Bearing at one end on the yoke $G^7$ and at the other end on the head $G^6$ is the helical spring $G^{10}$. This spring normally holds the printing head in the upward position shown in Figs. 4 and 5. In opposition to this spring the printing head may be depressed by a treadle or any suitable mechanism which is connected to the lower end of the rod $G^{11}$. The details of the treadle are not here shown as they form no part of the present invention. A stop $G^{12}$ limits the downward travel of the printing head.

The reciprocating motion of the feed member F is imparted in the following manner. Beneath the table and attached to the head $G^6$ is the rack H in combination with the pinion $H'$. As the member $G^6$ is depressed, the rack moves with it, and thus the pinion $H'$ is rotated. Attached to the pinion is the crank arm $H^2$ which has at its outer end a connection to the lever arm $H^3$ which is connected to a slide block $H^4$ which has the upwardly extending arm $H^5$ which through a slot $H^6$ in the frame A is fastened to the link $H^7$, which is attached to the feed member F. Thus by means of the vertical reciprocation of the printing head the member F is moved laterally backwards and forwards.

Forward movement is imparted to the sliding rod D by means of the reciprocation of the printing head or the means for effecting said reciprocation, in the following manner. Pivoted to the bottom of the base A in any suitable bearing $D'$ is a rock shaft $D^2$ which has mounted thereon two pairs of rocker arms $D^3$, $D^4$. On the arm $D^3$ are pivoted links $D^5$, the opposite ends of which are pivoted as at $D^6$ on the member $G^6$ which reciprocates with the printing head.

One rocker arm $D^4$ has pivoted at its end a link $D^7$ the opposite end of which is pivoted to a slide member $D^8$ mounted on the bottom of the base A in suitable guiding brackets $D^9$ $D^9$. Pivoted at another point on the slide member $D^8$ is a link $D^{10}$ on the opposite end of which is pivoted a link $D^{11}$ which is in turn pivoted upon the yoke or stirrup $D^{12}$ adapted to enclose the sliding rod D. A forward movement of the slide member $D^8$ with the link $D^{10}$ will rotate the link $D^{11}$ in the stirrup $D^{12}$ and compress the sliding rod member D between the top of the stirrup $D^{12}$ and the corner or bearing surface $D^{13}$ of the link $D^{11}$, which may be formed in any suitable manner to make a gripping contact, and thus move the rod, in response to the reciprocation of the printing head. Projecting upwardly from the member D is an upturned portion $D^{14}$ which is adapted to be penetrated by the feed carrier rod J. As earlier described the helical spring $J^3$, about this rod is compressed between the type contacting head $J^2$ and the upturned end $D^{14}$ of the slide rod D. The opposite end of the slide rod D is provided with a notch $D^{15}$ adapted to be engaged by the pawl $D^{16}$, which is normally seated against the side of the rod D by the yielding means $D^{17}$. If, by the excursion of the slide rod D the notch $D^{15}$ is brought opposite the pawl, the yielding means forces the pawl into the notch, and prevents further withdrawal of the rod. The rod D is guided in this excursion by any suitable bearing or bearings $D^{18}$. The other rocker arm $D^4$, on the rock shaft $D^2$ has pivoted to it an elongated link K in turn pivoted to the lug $K'$ on the slide block $F^5$ earlier described. This lug $K'$ is adapted to travel in a slot $K^2$ in the base A, and has at its lower end a plate $K^3$ of greater width than the slot. The member $F^5$ thus moves in response to the reciprocation of the printing head and pushes the type forward into the galley $F^4$, as illustrated in Fig. 2.

The use and operation of my invention are as follows:

The addresses are set up in type by any slug casting machine, or any other means found suitable. They are normally assembled in the galley which is placed with its open end at the bell mouth. The type is then pushed off into the guide way and the feed carrier is moved up to engage the type members. The type feed mechanism operates in response to the reciprocation of the printing head, the feed carrier moving progressively forward in a step by step process. Co-incident with this forward movement the feed member reciprocates laterally, and when it is in the forward position, it moves a predetermined number of type members out of the guide way and places them in the printing position. Paper is fed under the printing head or platen and over the type members and is printed. When the printing head is allowed to rise the feed member moves to the rear, then laterally, and finally returns to its forward position. With this second reciprocation it moves out of the way of the first used type bar and moves into the printing position the second type bar. The first type bar falls upon the receiving platform adjacent the end of the receiving galley. With further reciprocation of the printing head the type is pushed off of the receiving platform and into the receiving galley. Thus as the process is repeated the type bars are moved forward and a predetermined number of them is successively removed from the main type, moved laterally, printed upon, and moved away into the receiving galley. Although the movement has been described as involving one type bar, it could of course involve any suitable number. Adjustment is provided whereby any number of type bars may be moved laterally with each reciprocation of the machine. All the reciprocating parts are reciprocated in response to the reciprocation of the printing head. The used type are thus fed forward into the galley in a step by step movement.

I claim:

1. The combination with an addressing machine having a guide way adapted to receive type bars and means for progressively moving said bars forward in a step by step process of means for separating out a predetermined variable number of type bars.

2. The combination with an addressing machine having a guide way adapted to receive type bars and means for progressively moving said bars forward in a step by step process of means for separating a predetermined variable number of type bars, said means comprising a laterally operating removing member adapted to engage and move said bars.

3. In an addressing machine a guide way adapted to receive type bars, means for progressively moving said bars forward in a step by step process, means for separating out a predetermined variable number of type bars, means for printing from them.

4. In an addressing machine a guide way adapted to receive type bars, a vertically reciprocating printing head, means responsive to said vertical reciprocation for moving forward said type bars in a step by step process, means responsive to said reciprocation for separating out a predetermined variable number of said type bars for printing from them.

5. In an addressing machine a guide way adapted to receive type bars, a vertically reciprocating printing head, means responsive to said vertical reciprocation for moving forward said type bars in a step by step process, means responsive to said reciprocation for separating out a predetermined variable number of said type bars for printing from them, said means comprising a laterally reciprocating member adapted to engage and to move one or more said type bars.

6. In an addressing machine a guide way adapted to receive a plurality of type bars, a vertically reciprocating printing head, means for reciprocating the same, means responsive to said reciprocation for feeding forward said type bars and additional means for separating out a previously determined variable number of said type bars for printing from the same.

7. The process of printing from a plurality of type bars which consists in assembling and then automatically separating out a predetermined variable number of type bars from the main number, printing from the same, and automatically reassembling the type bars.

8. The process of printing from a plurality of type bars which consists in assembling and then automatically separating out a predetermined variable number of type bars from the main number, printing from the same, and automatically reassembling the type bars in the same order in which they originally stood.

9. In an addressing machine a guide way adapted to receive a plurality of type bars, a reciprocating printing head, means in response to said reciprocation for moving a predetermined variable number of said type bars laterally to the printing position, and means for further moving said bars laterally from said printing position.

10. In an addressing machine a guide way adapted to receive a plurality of type bars, a reciprocating printing head, means in response to said reciprocation for moving a predetermined variable number of said type bars laterally to the printing position, and means for further moving said bars laterally from said printing position, and an adjustable throat through which said type bars are moved.

Signed at Chicago, county of Cook, and State of Illinois, this 4th day of May, 1921.

RUPERT B. SMART.